Figure 3:
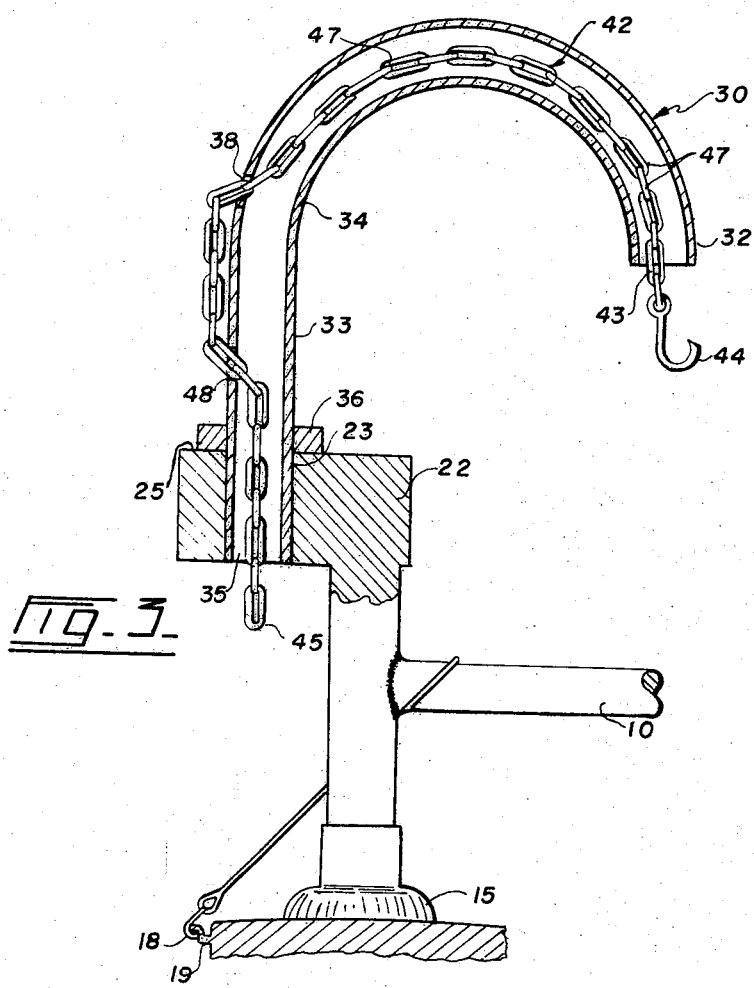

Dec. 26, 1967      P. F. D'ESTRUBÉ      3,360,144
CAR TOP BOAT LOADING AND CARRIER APPARATUS
Filed Oct. 23, 1965      2 Sheets-Sheet 1
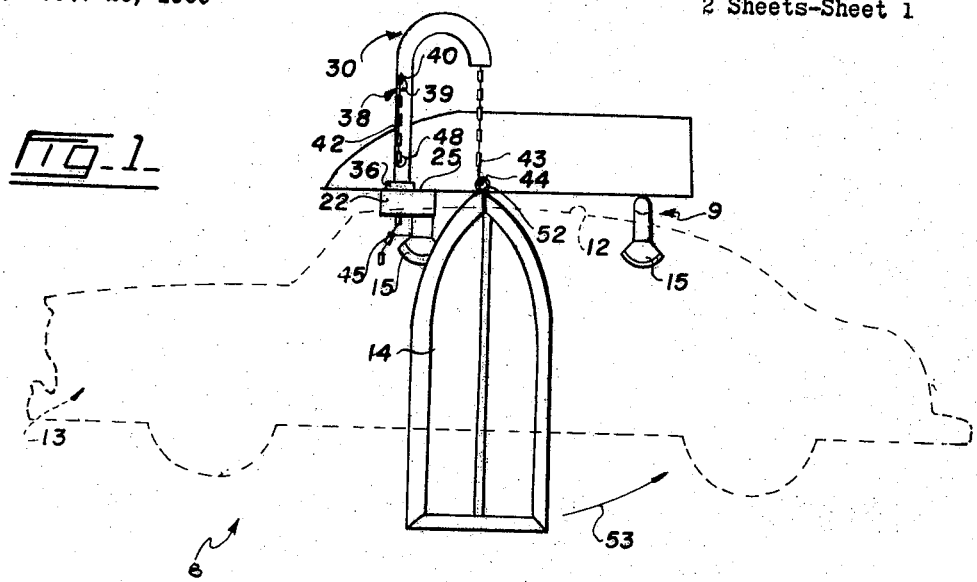
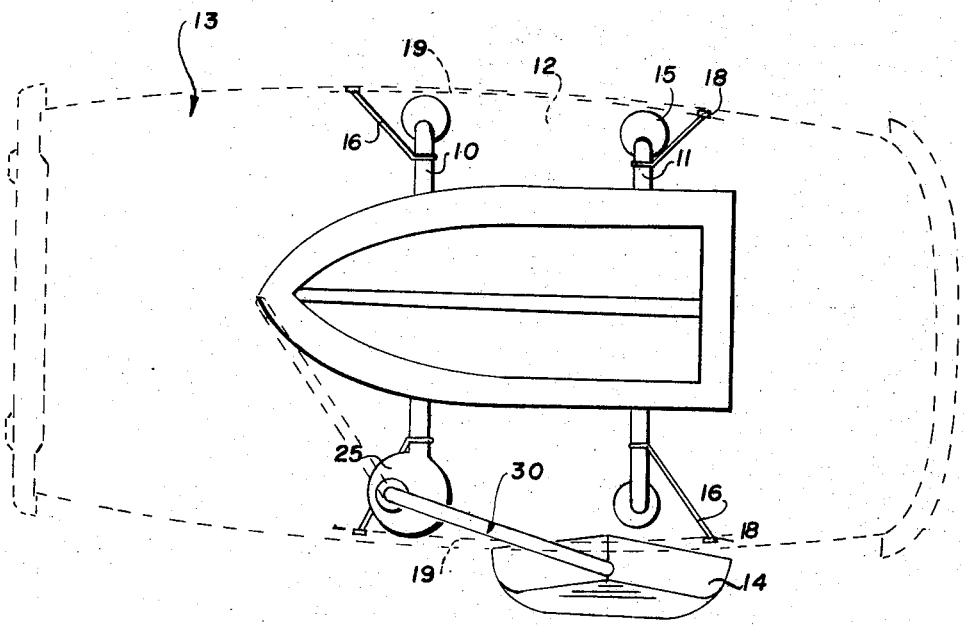
INVENTOR
PIERRE F. D'ESTRUBÉ
BY
Featherstonhaugh & Co.
ATTORNEYS Dec. 26, 1967 P. F. D'ESTRUBÉ 3,360,144
CAR TOP BOAT LOADING AND CARRIER APPARATUS
Filed Oct. 23, 1965 2 Sheets-Sheet 2

INVENTOR
PIERRE F. D'ESTRUBÉ
BY
ATTORNEYS

United States Patent Office 3,360,144
Patented Dec. 26, 1967

3,360,144
CAR TOP BOAT LOADING AND CARRIER
APPARATUS
Pierre Francois d'Estrubé, 1542 Athlone Drive,
Victoria, British Columbia, Canada
Filed Oct. 23, 1965, Ser. No. 503,292
1 Claim. (Cl. 214—450)

This invention relates to car top carriers and more particularly to a car top carrier and loading apparatus by means of which a boat or other like cumbersome load may be loaded on top of an automobile or car by one man.

The difficulties of loading a boat on the ordinary car top carrier, regardless of the weight of the boat, have resulted in the development of car top carriers having movable elements whereby boats and the like may be loaded and unloaded with a minimum of effort and with little or no damage done to the car.

Ordinarily, the weight of a boat which is to be carried on top of a standard automobile is not beyond the lifting capacity of one man. However, its shape and size precludes the unloading and loading thereof by one man and where it is attempted quite often results in extensive damage being done to the finish of the automobile. It is usually relatively simple to position the boat in an upright position resting against the side of the automobile. However, to lift the boat upwardly and on top of the car top carrier from this position, normally is beyond the capacity of one man.

Boat loading apparatus and which is operable by one man alone have not been entirely successful in view of the fact that they have been of complicated design and furthermore usually require adjustment in order to fit boats of various sizes and type. They are also, by reason of their intricate and complicated design, been relatively expensive and not sufficiently flexible enough in their operation to permit the use of automobiles having varied roof designs.

The present invention provides a boat loading and carrying apparatus which utilizes the davit arrangement by means of which one end of a boat may be lifted above the level of the car top carrier and which will automatically swing inboard to position the engaged end substantially centrally over the car while the other end of the boat is swung upwardly so as to properly position the boat centrally over the car. The davit arrangement is easily detachable from the rooftop carrier when the loading operation is finished and may be transported in the trunk of the car to be used when the boat is to be unloaded.

Furthermore, the apparatus in accordance with the present invention is of relatively simple construction and therefore inexpensive to manufacture, and by reason of its relatively few working parts, it is not subject to derangement or damage.

The use of the present invention is not limited to boats of fixed sizes or makes, but is sufficiently flexible in its operation to accommodate any type of load which is to be carried on the car top carrier.

The present invention comprises a rack having fore and aft transversely extending support members, a davit member having an elongated laterally extending arm supported for rotation on the rack at one side thereof whereby the arm is freely rotatable between a position in which it extends over the side of the car and a position in which it extends inwardly substantially over the longitudinal center line thereof, a cable member slidably carried by the davit member having an end extending beyond the free end of the arm, means for detachably securing one end of a boat to said one end of the cable so as to permit said boat to be fitted into an upright position adjacent the side of the car with said one end thereof extending above the rack, said davit member outwardly swivelling, when the other end of the boat is lifted and positioned on the after support member, so as to position said one end of the boat over the forward support member.

Figure 4:
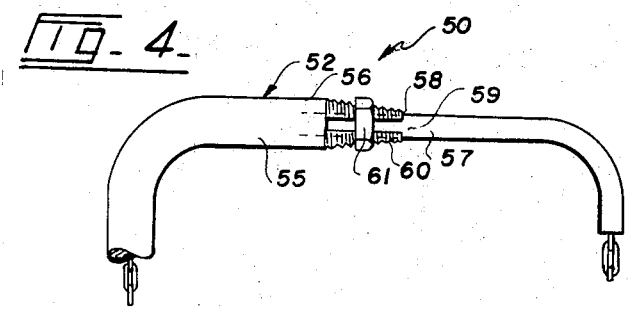

In the drawings which illustrate the invention,

FIGURE 1 is a side elevation of one embodiment of the invention showing an automobile in dotted lines and with a boat illustrated in its loaded and unloaded positions, FIGURE 2 is a view in plan showing the operation of the apparatus of FIGURE 1 also illustrating the positions assumed by the apparatus and the boat in the two positions illustrated in FIGURE 1, FIGURE 3 is an enlarged sectional side view taken centrally of the apparatus of FIGURE 1, and FIGURE 4 is a fragmentary sectional side view of a portion of another embodiment of the invention.

Referring to the drawings, FIGURES 1 to 3 of which illustrate one embodiment 8 of the invention, the numeral 9 generally designates a car top carrier and, in the form illustrated, comprises a pair of elongated supporting members 10 and 11 which are extended transversely across the roof 12 of an automobile 13, being spaced apart so that member 10 lies to the fore part of the roof and member 11 to the after part thereof. There are secured adjacent the ends of said members, suction cups 15 which engage the roof of the automobile and protect the finish thereof from being marred. Straps 16 suitably secured to the supporting members 10 and 11 and having hooks 18 normally engage the rain gutter 19 of the automobile to fixedly secure the supporting members 10 and 11 in position. At either end or both ends, if desired, of supporting member 10 as shown in detail in FIGURE 3 of the drawings, there is connected thereto or formed integrally therewith a socket member 22, said socket member is preferably of a metallic material such as steel or aluminum having an upwardly opening vertical bore 23 formed therein, the upper end 25 of the socket member being ground flat to provide a smooth relatively wide annular bearing surface.

The above description and drawings illustrate only one form of the car top carrier and socket member. However, it is to be appreciated that the car top carrier may be formed as a single rectangularly shaped platform and sockets provided at the corners thereof by simply forming vertical bores in the structural members thereof. It is not considered nor is it necessary to illustrate the above as there are many and varied forms of car top carriers and sockets which may be provided in many and varied ways.

The bore 23 is arranged to rotatably receive and support in a vertical position the davit member 30. This davit member is preferably formed of a single length of tubular steel pipe which is bent adjacent one end 32 in the form of a semi-circle of relatively large diameter thereby taking the form of a hook having an elongated straight leg portion 33 and an arcuately shaped laterally extending arm 34. In practice, the length of the leg 33 would be approximately 1½ to 2 feet and the arm 34 would extend laterally outwardly therefrom approximately 1½ feet. There is secured to the leg 33 spaced inwardly approximately 4 to 5 inches from its end 35, an annular flange 36. This flange 36 may be welded to the pipe so that the connection therewith is strong and rigid. The leg 33 also has formed therein adjacent the flange 36 and located between the latter and the arm 34, an aperture 38, said aperture taking the form of a keyhole having a large circular portion 39 and an upwardly extending narrow slotted portion 40.

The outside diameter of the davit member 30 is such that its end 35 may be slidably and rotatably inserted in the bore 23 of the socket member 32 with the flange 36 engaging the ground upper end 25 of the latter. It is intended that the davit member shall be freely and easily rotatable relative to the socket member, and the engaging parts thereof may therefore be greased for this purpose. If desired, suitable roller or ball bearings, not shown, may be employed to provide rolling friction between the flange 36 and the ground upper end 25 of the socket 22.

The relatively tight rotatable fit of the leg 33 within the bore 23 of the socket 22 provides both vertical and horizontal support for the davit member and it is to be understood that the strength of the apparatus as heretofore described shall be sufficient to enable the davit member to support, in its upright position, the relatively heavy load depending from the arm thereof.

Extending through the arm and leg of the davit member is a cable 42, one end 43 of the latter to which a hook 44 is secured extending outwardly of the arm 34, and the other end 45 thereof extending out of the aperture 38. The cable 42 shall be such that it slides relatively freely through the davit member and it is preferred therefore to employ a cable in the form of a chain, the links 47 thereof which will freely pass through the circular portion 39 of the aperture 38 but which may also be releasably engaged with the slot portion 40 thereof so as to prevent movement of the chain relative to the davit member. In order to prevent tangling of the cable, the latter may be passed through a second aperture 48 formed in the leg 33 just below aperture 38 so that the end 45 passes outwardly through the bottom of the leg.

The davit member 30 will be ordinarily carried in the trunk of the automobile and, when required, positioned as aforesaid with the end 35 in the bore 22 of the socket member. In the use of the apparatus, the boat herein numbered 14, may be positioned so as to rest against the side of the automobile with the prow uppermost. The hook 44 is then engaged in the bull ring 52 or the like with which most boats are provided and the boat raised until the prow is slightly above the level of the supporting member 10. The cable 40 is then engaged in the slotted portion 40 of the aperture 38 and the stern of the boat then lifted and swung upwardly, in the direction as shown by the arrow 53, to a position on top of the supporting member 11. During the lifting and swinging motion of the prow, it will be seen that the davit member which is free to rotate will rotate from a position over the side of the automobile to a position substantially centrally thereof so as to locate the prow substantially on the centre line of the automobile. The cable 42 may then be disengaged from the slotted portion 40 of the aperture and allowed to run free, thus lowering the boat on to the supporting member 10 where it may be easily positioned on the exact centre line of the automobile and securely fastened to the supporting members in some suitable manner. The hook 44 may then be disengaged from the boat, the davit member lifted out of the socket and stored in the trunk of the automobile. It will be appreciated that the davit 30 may be so correlated in size to the boat that the boat will automatically assume a central position on the automobile when loaded thereon without need for further adjustment. In order to unload the boat from the automobile, it is of course only necessary to reverse the above procedure.

It will be seen that in the loading and unloading operation, once the boat has been positioned alongside the automobile, the davit member will support at least half the weight of the boat and will automatically position one end of the latter while one man may easily lift and swing the other end of the boat in the manner described.

FIGURE 4 illustrates a fragmentary portion of another embodiment 50 of the invention which is alike in every respect to embodiment 8 with the exception of an arm 52 which corresponds to the arm 34 of embodiment 8.

Arm 52 instead of being arcuately shaped throughout as is arm 34 of embodiment 8, has a straight laterally extending section 55, the latter being formed of a pair of telescopically united parts 56 and 57. Part 56 slidably receives part 57. The free end 58 of part 56 is split as at 59 and is provided with a tapered thread as at 60 to receive a nut 61, the latter being employed to bind the parts against relative movement after they have been telescopically adjusted. It will be seen that arm 52 may be adjusted for length so as to be suitable for loading boats of varied lengths and widths.

What I claim as my invention is:

A car top boat carrier comprising, when positioned on a car top, a rack having fore and aft transversely extending support members, a socket member having an upwardly opening vertical bore secured to the forward support member adjacent a side of the car, a tubular davit member having a vertically extending elongated leg rotatably received at its lower end in the bore of the socket member and having an arcuate arm extending laterally from the upper end of the leg, said davit member being freely rotatable with respect to the socket member so as to permit the arm to be moved between a position in which it extends over said side of the car top and a position in which it extends substantially over the centre line thereof, said leg having an aperture formed therein spaced above its lower end, a chain slidably extending through the davit member with one end thereof extending outwardly of the arm and the other end extending outwardly through the aperture, means for releasably securing one end of a boat to said one end of the chain, so as to permit the latter to be operated to position the boat in an upright position adjacent the side of the car with the said one end of the boat extending above the rack, said davit member automatically swivelling to its last mentioned position when the other end of the boat is lifted and positioned on the after support member so as to position said one end of the boat substantially centrally over the forward support member, said aperture being of inverted key hole shape so as to permit releasable engagement of the leg and chain.

References Cited

UNITED STATES PATENTS

| | | | |
|---|---|---|---|
| 1,345,008 | 6/1920 | Hill | 212—55 |
| 2,465,118 | 3/1949 | Platt | 9—39 X |
| 2,684,109 | 7/1954 | Youmans | 212—55 X |
| 3,215,294 | 11/1965 | Salamin | 214—450 |

HUGO O. SCHULZ, *Primary Examiner.*